United States Patent
Sawamoto et al.

(10) Patent No.: US 7,289,017 B2
(45) Date of Patent: Oct. 30, 2007

(54) VEHICULAR CONTROL OBJECT DETERMINATION SYSTEM AND VEHICLE CONTROL SYSTEM

(75) Inventors: Kiichiro Sawamoto, Saitama (JP); Shigeru Inoue, Saitama (JP); Hiroshi Sato, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 247 days.

(21) Appl. No.: 11/255,904

(22) Filed: Oct. 20, 2005

(65) Prior Publication Data

US 2006/0149452 A1 Jul. 6, 2006

(30) Foreign Application Priority Data

Oct. 29, 2004 (JP) .............................. 2004-315298

(51) Int. Cl.
*B60Q 1/00* (2006.01)
(52) U.S. Cl. .................... 340/425.5; 340/435; 340/436; 340/903; 701/36; 701/96; 701/301
(58) Field of Classification Search ............ 340/425.5, 340/435, 436, 3.1, 5.1, 903; 701/36, 39, 701/41, 117, 301, 96, 93
See application file for complete search history.

(56) References Cited

U.S. PATENT DOCUMENTS 5,748,321 A * 5/1998 Burks et al. ................ 356/635
6,324,462 B1 * 11/2001 Kageyama .................... 701/93
6,775,395 B2 * 8/2004 Nishigaki et al. ........... 382/104
7,242,281 B2 * 7/2007 Quintos .................. 340/426.11

FOREIGN PATENT DOCUMENTS

JP 2001-191876 7/2001

* cited by examiner

*Primary Examiner*—Toan N. Pham
(74) *Attorney, Agent, or Firm*—O'Melveny & Myers LLP (57) ABSTRACT

In a vehicular control object determination system, the position of an object detected by a radar device is stored by a detection position memory, and a predetermined area having the position of the object as the center is set as the determination region by a determination region setter. When the determination region set for one of two objects is passed through by the other object, the passing direction is determined by a passing direction determiner. During this process, the direction in which a fixed object or an object dropped on the road moves relative to a preceding vehicle is a direction in which the fixed object or the dropped object on the road approaches the subject vehicle with the preceding vehicle as a reference. Then, a control object determiner excludes from determination of the control object an object for which the passing direction determined by the passing direction determiner is a direction approaching the subject vehicle, thereby preventing the fixed object or the dropped object from being erroneously determined as the control object when the preceding vehicle passes over the fixed object or the dropped object on the road.

7 Claims, 6 Drawing Sheets

VEHICULAR CONTROL OBJECT DETERMINATION SYSTEM AND VEHICLE CONTROL SYSTEM

RELATED APPLICATION DATA

The present application claims priority to Japanese priority application No. 2004-315298, filed Oct. 29, 2004, which is hereby incorporated in its entirety herein by reference.

BACKGROUND OF THE INVENTION

1. Field of the Invention

The present invention relates to a vehicular control object determination system that includes an object detector capable of detecting a plurality of objects that are present in the direction of travel of a vehicle, and a control object determiner for determining an object, as a control object for a subject vehicle, based on a detection result obtained by the object detector. Also, the present invention relates to a vehicle control system that includes the above-described vehicular control object determination system.

2. Description of Related Art

Japanese Patent Application Laid-open No. 2001-191876 discloses an arrangement in which, among objects detected by a vehicle-mounted radar device, stationary objects such as an object dropped on a road are extracted; among them, objects for which dispersion of the reception level of reflected waves in a region where the relative distance is 20 m to 100 m is equal to or less than a first threshold value are extracted; among them, objects that are on a predicted route of a subject vehicle are extracted; and among them, an object for which a reduction percentage in the reception level, in a region where the relative distance is on the order of 10 m to 20 m, is equal to or greater than a second threshold value and the reception level is equal to or less than a third threshold value is determined to be an object that can be passed over without problem, thus stopping or moderating execution of an alarm or automatic braking which would otherwise make a driver feel uncomfortable.

However, in the above-mentioned conventional arrangement, since the determination is carried out based on the reception level of waves reflected from an object, the reception level of reflected waves varies depending on the shape and material of the object, thus causing the problem that the determination accuracy is degraded. Furthermore, when an object is present in the vicinity of a point at which the road surface grade changes, this produces a change in the effect of waves reflected from the road surface, leading to a problem of deterioration of determination accuracy.

SUMMARY OF THE INVENTION

The present invention has been accomplished under the above-mentioned circumstances, and it is an object thereof to reliably distinguish a preceding vehicle, which becomes a control object when controlling the travel of a subject vehicle, from a fixed object or an object dropped on a road.

In order to achieve the above-mentioned object, according to a first feature of the invention, there is provided a vehicular control object determination system comprising: an object detector capable of detecting a plurality of objects that are present in the direction of travel of a vehicle; a control object determiner for determining an object, as a control object for a subject vehicle, based on a detection result obtained by the object detector; a detection position memory for storing the position of an object detected by the object detector; a determination region setter for setting as a determination region a predetermined area having the position of the object as the center; and a passing direction determiner for determining a passing direction when a determination region set for one object is passed through by another object; the control object determiner excluding from determination of a control object an object for which the passing direction determined by the passing direction determiner is a direction approaching the subject vehicle.

With the first feature of the present invention, the position of the object detected by the object detector is stored by the detection position memory, the predetermined area having the position of the object as the center is set as the determination region by the determination region setter, and when the determination region set for one of the objects is passed through by the other object, the passing direction is determined by the passing direction determiner. During this process, the direction in which a fixed object or an object dropped on the road moves relative to a preceding vehicle is a direction in which the fixed object or the dropped object on the road approaches the subject vehicle with the preceding vehicle as a reference. Then, the control object determiner excludes from determination of the control object an object for which the passing direction determined by the passing direction determiner is a direction approaching the subject vehicle, thereby preventing the fixed object or the dropped object from being erroneously determined as the control object when the preceding vehicle passes over the fixed object or the dropped object on the road.

According to a second feature of the invention, there is provided a vehicular control object determination system comprising: an object detector capable of detecting a plurality of objects that are present in the direction of travel of a vehicle; a control object determiner for determining an object, as a control object for a subject vehicle, based on a detection result obtained by the object detector; a detection position memory for storing the position of an object detected by the object detector; a determination region setter for setting as a determination region a predetermined area having the position of the object as the center; and an absolute speed detector for detecting an absolute speed of an object detected by the object detector; the control object determiner excluding from determination of a control object, when a determination region set for one object is passed through by another object, the object that has the smaller absolute speed detected by the absolute speed detector.

With the second feature of the present invention, the position of the object detected by the object detector is stored by the detection position memory, the predetermined area having the position of the object as the center is set as the determination region by the determination region setter, and the absolute speed of the object detected by the object detector is detected by the absolute speed detection means. During this process, the absolute speed of the fixed object or the object dropped on the road which does not move relative to the road is small, and the absolute speed of the preceding vehicle which does move relative to the road is large. Therefore, it is possible to prevent the fixed object or the dropped object from being erroneously determined as the control object when the preceding vehicle passes over the fixed object or the dropped object, by excluding from determination of the control object the object whose absolute speed is smaller.

According to a third feature of the present invention, in addition to the second feature, the absolute speed detector detects an absolute speed of the object from a vehicle speed of the subject vehicle detected by a vehicle speed sensor and a relative speed of the object detected by the object detector.

With the third feature of the present invention, since the absolute speed of the object is detected from the vehicle speed of the subject vehicle detected by the vehicle speed sensor and the relative speed of the object detected by the object detector, the absolute speed of the object can be detected by using the existing object detector and the vehicle speed sensor which is generally provided in a vehicle.

According to a fourth feature of the present invention, in addition to any one of the first to third features, the system further comprises vehicle controller for controlling the state of motion of the subject vehicle according to the state of motion of the control object.

With the fourth feature of the present invention, since the state of motion of the subject vehicle is controlled according to the state of motion of the control object determined by the vehicular control object determination system, it is possible to prevent the subject vehicle from being inappropriately controlled according to the state of motion of an object that is not the control object.

The above-mentioned object, other objects, characteristics, and advantages of the present invention will become apparent from an explanation of preferred embodiments that will be described in detail below by reference to the attached drawings.

BRIEF DESCRIPTION OF THE DRAWINGS

FIG. 1 to FIG. 4B show a first embodiment of the present invention.

FIG. 5 and FIG. 6 show a second embodiment of the present invention.

DETAILED DESCRIPTION OF THE PREFERRED EMBODIMENT

Figure 1:
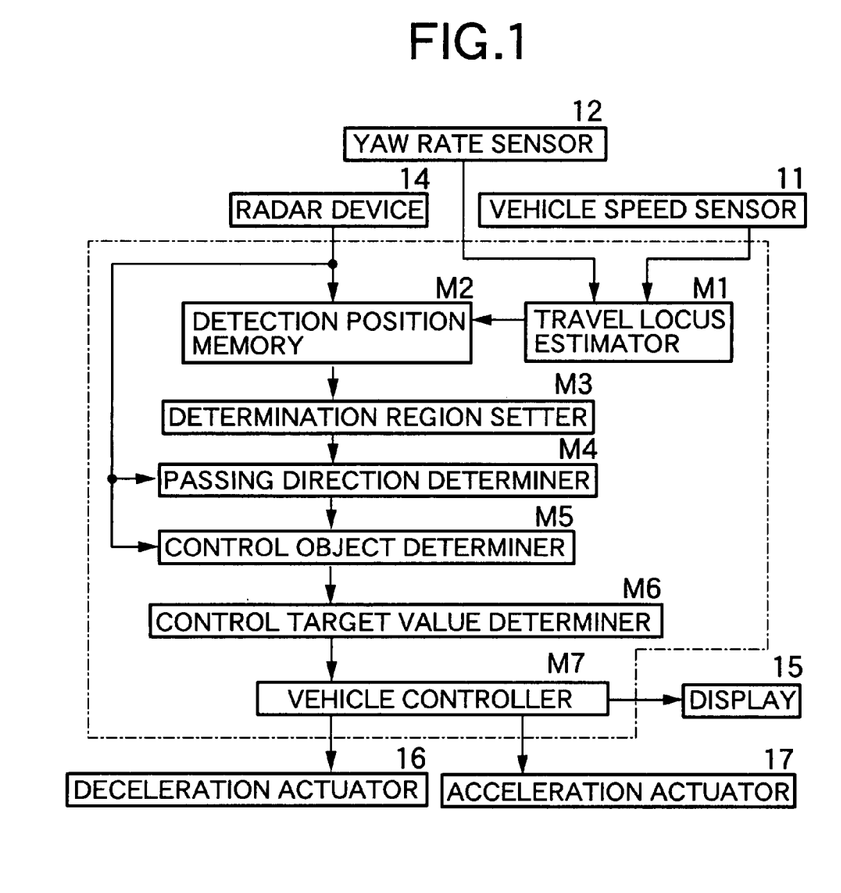
FIG. 1 is a block diagram of a control system for an ACC system.

As shown in FIG. 1, an ACC (Adaptive Cruise Control) system which maintains a preset inter-vehicle distance when there is a preceding vehicle, thus tracking the preceding vehicle, and maintains a preset vehicle speed when there is no preceding vehicle, thus keeping the speed constant. The ACC system includes: travel locus estimator M1; detection position memory M2; determination region setter M3; passing direction determiner M4; control object determiner M5; control target value determiner M6; and vehicle controller M7.

Connected to the travel locus estimator M1 are a vehicle speed sensor 11 and a yaw rate sensor 12. Connected to the detection position memory M2 is a radar device 14. Connected to the vehicle controller M7 are a display 15, a deceleration actuator 16, and an acceleration actuator 17.

Figure 3:
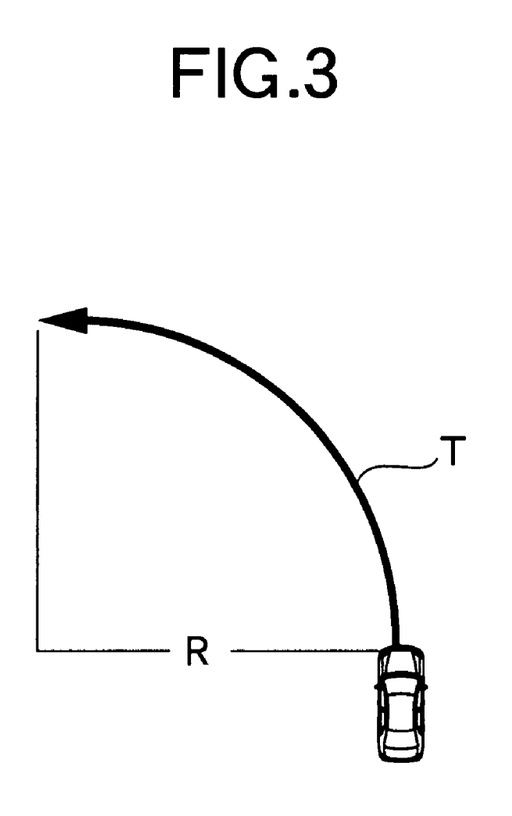
FIG. 3 is a diagram for explaining a method for estimating a future travel locus of a subject vehicle.

As shown in FIG. 3, the travel locus estimator M1 estimates a future travel locus T of a subject vehicle based on a vehicle speed detected by the vehicle speed sensor 11 and a yaw rate detected by the yaw rate sensor 12. That is, since a turning radius R of the vehicle can be calculated from a present vehicle speed and yaw rate, the future travel locus T of the subject vehicle can be estimated by joining an arc having the turning radius R to a present direction of travel of the subject vehicle.

Among objects detected by the radar device 14, the detection position memory M2 stores the position (the center position) of an object present on the future travel locus of the subject vehicle estimated by the travel locus estimator M1 at predetermined time intervals. The determination region setter M3 sets a predetermined determination region around the center position of the object stored by the detection position memory M2. The size of this determination region is made to be about the size of a typical automobile.

Figure 4A:
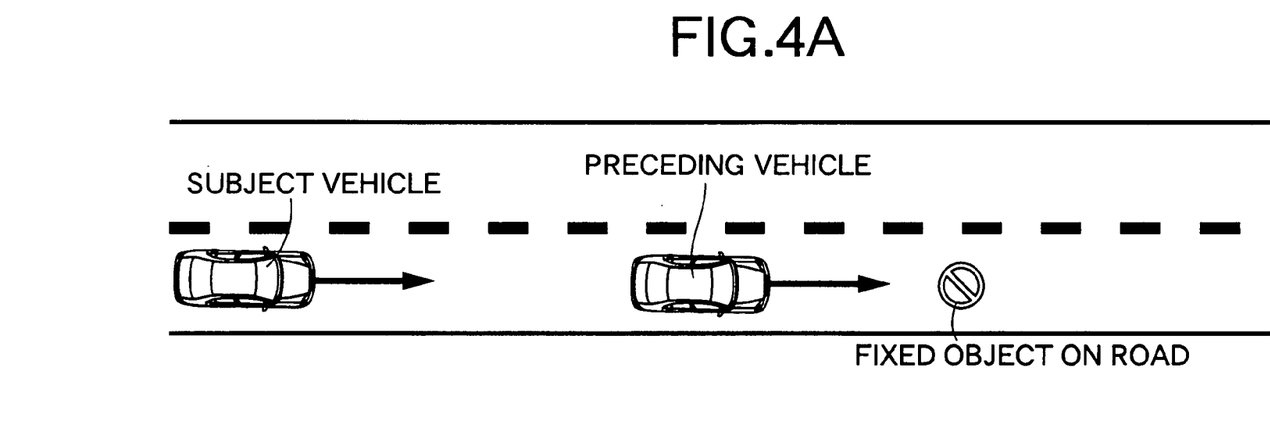
FIGS. 4A and 4B are diagrams for explaining the operation when a preceding vehicle passes over a fixed object on a road.
Figure 4B:
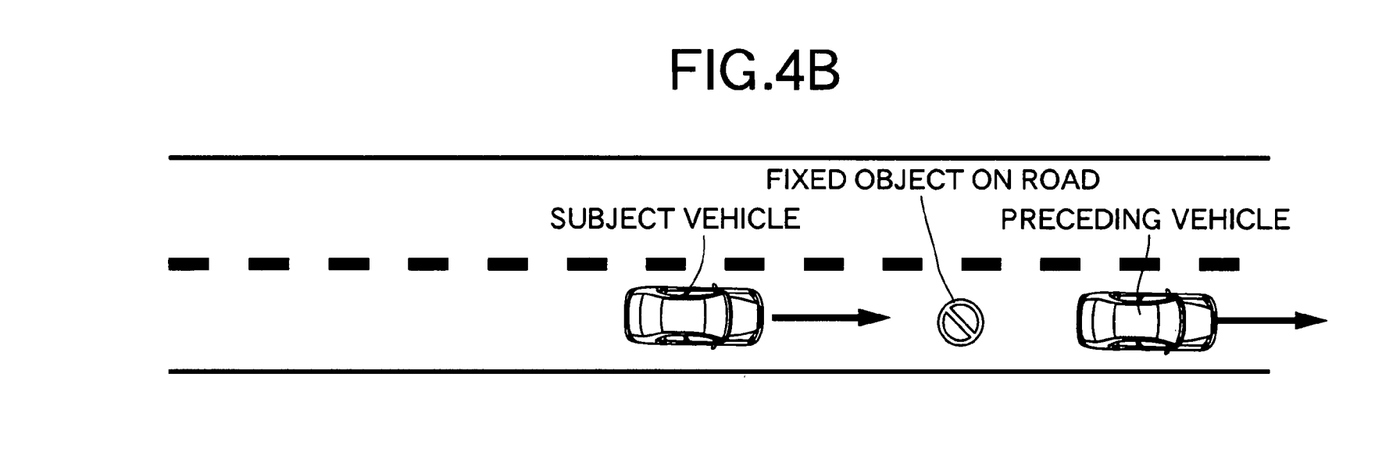

A case is considered in which, as shown in FIG. 4A, a preceding vehicle is present on a road ahead of the subject vehicle, and a fixed object such as a manhole cover is present ahead of the preceding vehicle. The radar device 14 detects both the preceding vehicle and the fixed object, but the control object determiner M5 determines as the control object the preceding vehicle, which is closer to the subject vehicle, and tracking control of the subject vehicle is carried out so as to maintain a constant inter-vehicle distance with this control object (that is, the preceding vehicle). When a certain period of time has elapsed and as shown in FIG. 4B, the preceding vehicle has passed over the fixed object, the control object determiner M5 determines as the control object the fixed object which is closer to the subject vehicle, instead of the preceding vehicle, and tracking control of the subject vehicle is carried out so as to maintain a constant inter-vehicle distance with this control object (that is, the fixed object). In this case, since the subject vehicle rapidly approaches the fixed object which is fixed to the road, the subject vehicle is automatically braked due to the tracking control attempting to maintain a constant distance from the fixed object, and the driver might be made to feel uncomfortable.

In order to eliminate such an inconvenience, It is necessary to distinguish a fixed object such as a manhole cover which can be passed over, from the preceding vehicle, and exclude this fixed object from determination of the control object, thereby continuing to determine as the control object the preceding vehicle which has passed over the fixed object.

In the present embodiment, when the center of the fixed object passes through the determination region set around the center of the preceding vehicle, or when the center of the preceding vehicle passes through the determination region set around the center of the fixed object, the relative passing direction between them is determined by the passing direction determiner M4, and the control object determiner M5 determines the control object based on the passing direction.

That is, the radar device 14 cannot distinguish the preceding vehicle from the fixed object, but when the preceding vehicle passes over the fixed object, the direction in which the fixed object passes the preceding vehicle is always a direction approaching the subject vehicle, so that the control object determiner M5 can determine, among the two objects detected by the radar device 14, an object that passes the other object in a direction approaching the subject vehicle as the fixed object, and determine the other object as the preceding vehicle. As a result, even when the preceding vehicle passes over the fixed object and the fixed object becomes closer to the subject vehicle than is the preceding vehicle, the fixed object is not erroneously determined as the control object. Therefore, it is possible to continue to carry out tracking control with respect to the preceding vehicle without problems, by continuing to determine the preceding vehicle as the control object.

The control target value determiner M6 determines a target vehicle speed, a target acceleration/deceleration, a target inter-vehicle distance, etc., which are parameters used for making the subject vehicle track the preceding vehicle that is the control object. The vehicle controller M7 operates the deceleration actuator 16 and the acceleration actuator 17 based on a control target value determined by the control target value determiner M6 so as to open and close a throttle valve or operate a brake system, thus carrying out tracking control or constant speed travel control, and displays a present control state of the vehicle on the display 15 so as to inform a driver thereof.

Figure 2:
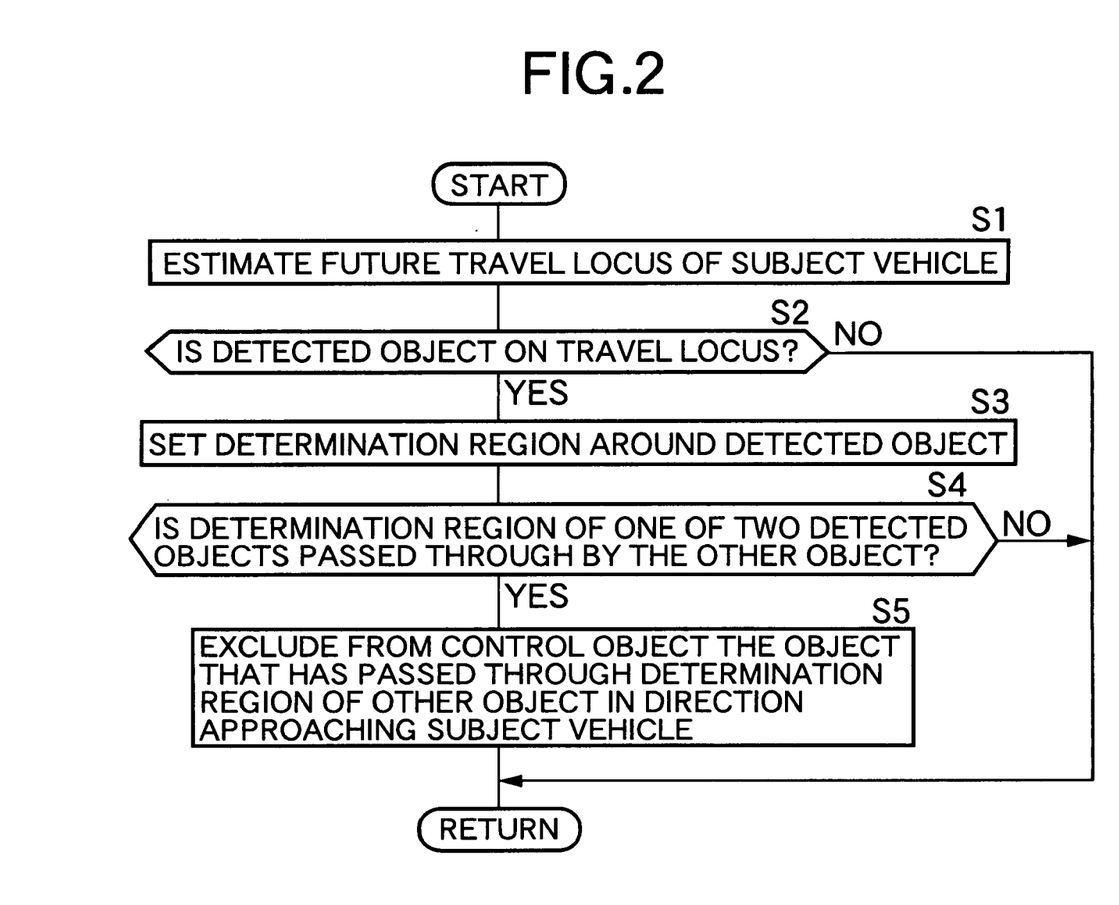
FIG. 2 is a flowchart for explaining the operation.

The operation of the first embodiment is now further explained by reference to the flowchart of FIG. 2.

Firstly in step S1 the travel locus estimator M1 estimates the future travel locus of the subject vehicle based on the yaw rate and the vehicle speed. In the subsequent step S2, if an object detected by the radar device 14 is present on the future travel locus of the subject vehicle, the detection position memory M2 stores the position of the detected object, and then in step S3 a predetermined detection region is set around the center of the detected object. In the subsequent step S4, if, among two detected objects, the detection region of one of the objects is passed through by the other object, then in step S5, among the two detected objects, the object that has passed the other object in a direction approaching the subject vehicle is determined as being a fixed object on the road, and the fixed object on the road is excluded from determination of the control object. As a result, an object that is not the fixed object on the road, that is, the preceding vehicle, can be determined correctly as the control object.

A second embodiment of the present invention is now explained by reference to FIG. 5 and FIG. 6.

Figure 5:
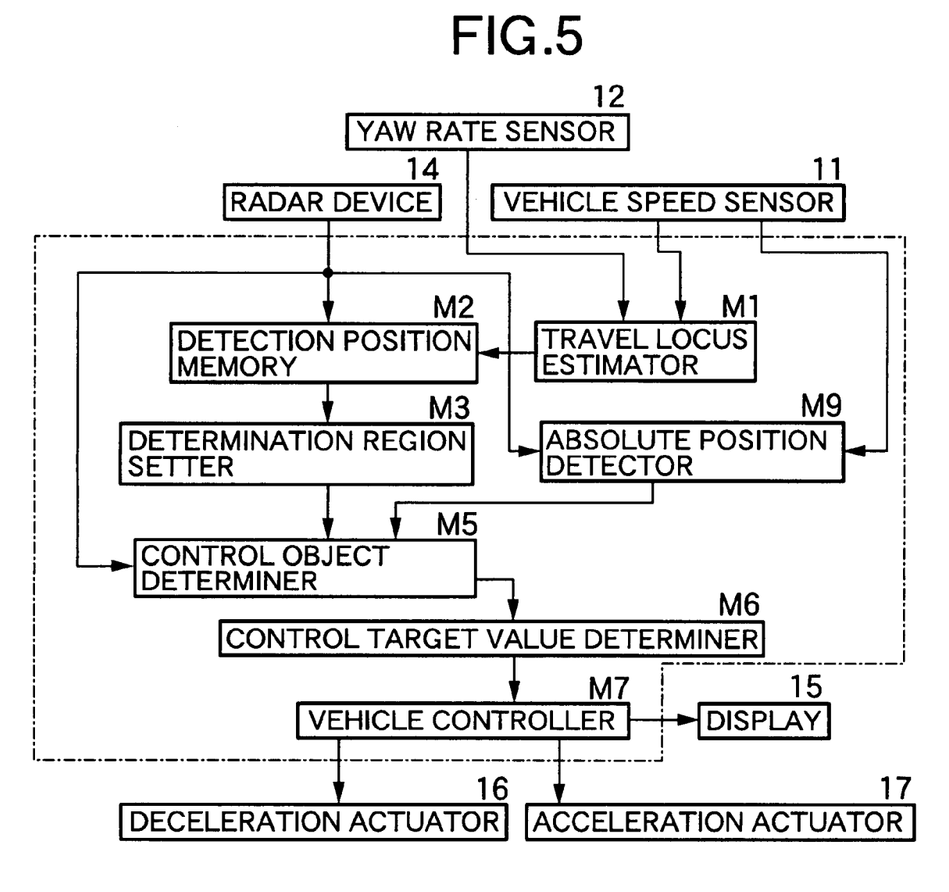
FIG. 5 is a block diagram of a control system for an ACC system.
Figure 6:
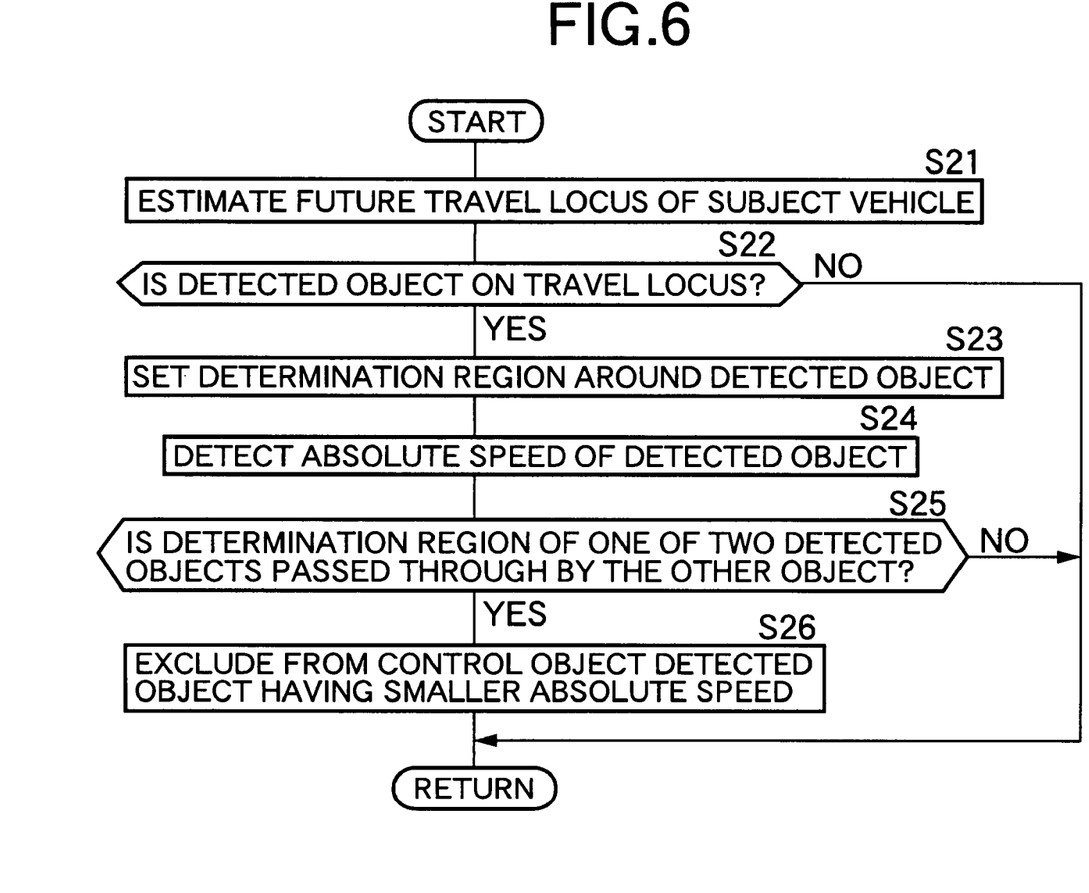
FIG. 6 is a flowchart for explaining the operation.

As shown in FIG. 5, the second embodiment does not include the passing direction determiner M4 (see FIG. 1) of the first embodiment, but instead includes absolute speed detector M9 connected to a vehicle speed sensor 11 and a radar device 14. The absolute speed detector M9 detects an absolute speed (a speed relative to the road) of an object by subtracting a vehicle speed of a subject vehicle detected by the vehicle speed sensor 11 from a speed relative to the subject vehicle of the object detected by the radar device 14. When the radar device 14 is a millimeter wave radar, the relative speed can be detected immediately by the Doppler effect, and when the radar device 14 is a laser radar, the relative speed can be calculated immediately from the rate of change with respect to time of the distance between the subject vehicle and the object.

When, among two detected objects, a determination region set around the center of one object is passed through by the other object, or when a determination region set around the center of said other object is passed through by said one object, the control object determiner M5 can determine, among the two objects, the object having the smaller absolute speed as a fixed object on the road. This is because a fixed object on the road has an absolute speed of 0 whereas a traveling preceding vehicle has a certain absolute speed.

In this way, since the two detected objects can be distinguished as the fixed object on the road and the preceding vehicle, by excluding the fixed object on the road from determination of the control object to determine the preceding vehicle as the control object, even if the preceding vehicle passes over the fixed object and the fixed object becomes closer to the subject vehicle than is the preceding vehicle, the fixed object is not erroneously determined as the control object. Therefore, it is possible to continue to carry out tracking control with respect to the preceding vehicle without problems, by continuing to determine the preceding vehicle as the control object.

The operation of the second embodiment is now further explained by reference to the flowchart of FIG. 6.

Firstly in step S21, the travel locus estimator M1 estimates the future travel locus of the subject vehicle based on the yaw rate and the vehicle speed. In the subsequent step S22, if an object detected by the radar device 14 is present on the future travel locus of the subject vehicle, the detection position memory M2 stores the position of the detected object, in step S23 a predetermined detection region is set around the center of the detected object, and in step S24 the absolute speed detector M9 detects an absolute speed of the detected object from the relative speed of the detected object and the vehicle speed of the subject vehicle. In the subsequent step S25, if the detection region of one of two detected objects is passed through by the other object, then in step S26, among the two detected objects, the object that has the smaller absolute speed is determined as being a fixed object on the road, and the fixed object on the road is excluded from determination of the control object. As a result, the object that is not the fixed object on the road, that is, the preceding vehicle, can be determined correctly as the control object.

Although embodiments of the present invention have been described above, the present invention can be modified in a variety of ways without departing from the subject matter of the present invention.

For example, an ACC system has been described in the embodiments, but the present invention is not limited to the ACC system and is applicable to a vehicular travel locus estimation system or a vehicular control object determination system for any purpose.

Furthermore, the fixed object on the road is not limited to a manhole cover, etc., and can be a dropped object, etc., which the vehicle can pass over while traveling.

What is claimed is:

1. A vehicular control object determination system comprising:
   an object detector capable of detecting a plurality of objects that are present in the direction of travel of a vehicle;
   a control object determiner for determining an object, as a control object for a subject vehicle, based on a detection result obtained by the object detector;
   a detection position memory for storing the position of an object detected by the object detector;
   a determination region setter for setting as a determination region a predetermined area having the position of the object as the center; and
   a passing direction determiner for determining a passing direction when a determination region set for one object is passed through by another object;
   the control object determiner excluding from determination of a control object an object for which the passing direction determined by the passing direction determiner is a direction approaching the subject vehicle.

2. The vehicular control object determination system according to claim 1, further comprising a vehicle controller for controlling the state of motion of the subject vehicle according to the state of motion of the control object.

3. A vehicular control object determination system comprising:
   an object detector capable of detecting a plurality of objects that are present in the direction of travel of a vehicle;

a control object determiner for determining an object, as a control object for a subject vehicle, based on a detection result obtained by the object detector;

a detection position memory for storing the position of an object detected by the object detector;

a determination region setter for setting as a determination region a predetermined area having the position of the object as the center; and an absolute speed detector for detecting an absolute speed of an object detected by the object detector;

the control object determiner excluding from determination of a control object, when a determination region set for one object is passed through by another object, the object that has the smaller absolute speed detected by the absolute speed detector.

4. The vehicular control object determination system according to claim 3, wherein the absolute speed detector detects an absolute speed of the object from a vehicle speed of the subject vehicle detected by a vehicle speed sensor and a relative speed of the object detected by the object detector.

5. A method of determining a vehicular control object comprising:

detecting a plurality of objects that are present in the direction of travel of a vehicle;

determining an object, as a control object for a subject vehicle, based on a detection result;

storing the position of an object detected;

setting as a determination region a predetermined area having the position of the object as the center;

determining a passing direction when a determination region set for one object is passed through by another object; and excluding from determination of a control object an object for which the passing direction is a direction approaching the subject vehicle.

6. A method for determining a vehicular control object comprising:

detecting a plurality of objects that are present in the direction of travel of a vehicle;

determining an object, as a control object for a subject vehicle, based on a detection result;

storing the position of an object detected;

setting as a determination region a predetermined area having the position of the object as the center;

detecting an absolute speed of an object detected; and excluding from determination of a control object, when a determination region set for one object is passed through by another object, the object that has the smaller absolute speed detected by the absolute speed detector.

7. The method according to claim 6, further comprising detecting an absolute speed of the object from a vehicle speed of the subject vehicle and a relative speed of the object.

* * * * *